United States Patent [19]

Carr et al.

[11] 4,387,837
[45] Jun. 14, 1983

[54] VEHICLE SPARE TIRE CARRIER

[75] Inventors: Marvin K. Carr; Cheryl D. Smith, both of Hampton, Iowa

[73] Assignee: Diane Kenneth Ltd., Hampton, Iowa

[21] Appl. No.: 295,703

[22] Filed: Aug. 24, 1981

[51] Int. Cl.³ ............................................. B65D 43/08
[52] U.S. Cl. .............................. 224/42.21; 224/42.12; 224/42.24
[58] Field of Search ................ 224/42.21, 42.12, 42.24

[56] References Cited

U.S. PATENT DOCUMENTS

| | | | |
|---|---|---|---|
| 3,204,840 | 9/1965 | Bowen | 224/42.24 |
| 3,613,972 | 10/1971 | Daughetee | 224/42.24 |
| 3,990,618 | 11/1976 | Shattuck | 224/42.24 |
| 4,007,863 | 2/1977 | Norris | 224/42.24 |
| 4,241,858 | 12/1980 | Lawroski | 224/42.21 X |
| 4,366,923 | 1/1983 | Koch | 224/42.24 |

Primary Examiner—Steven M. Pollard
Attorney, Agent, or Firm—Zarley, McKee, Thomte, Voorhees & Sease

[57] ABSTRACT

A tire carrier bracket includes a vertically disposed frame member having telescopic sections with a head on the upper section positioned between a sidewall of a pickup truck box and the downwardly extending flange of a ledge on the sidewall. A foot on the lower end of the frame member engages the floor. A bolt connected to the frame is connected to the wheel of the tire and clamps the downwardly extending flange between the tire and the frame.

4 Claims, 5 Drawing Figures

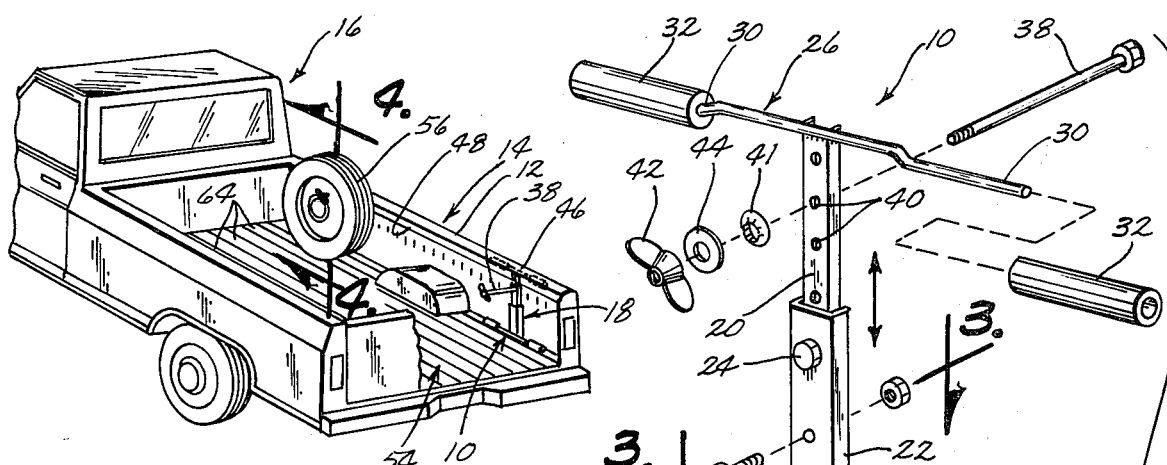
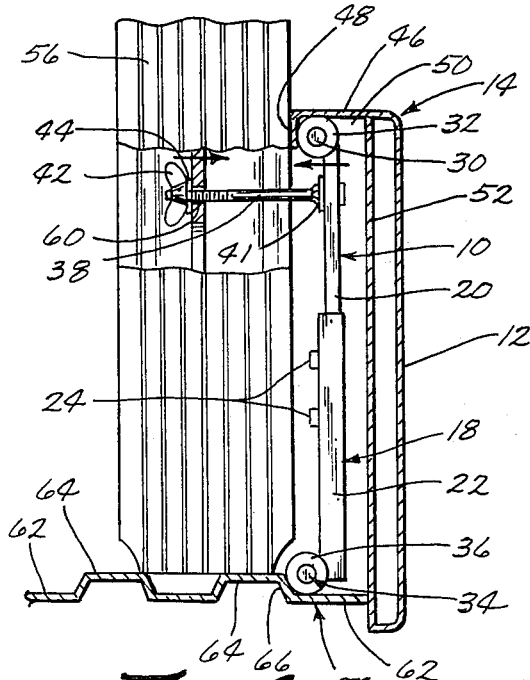
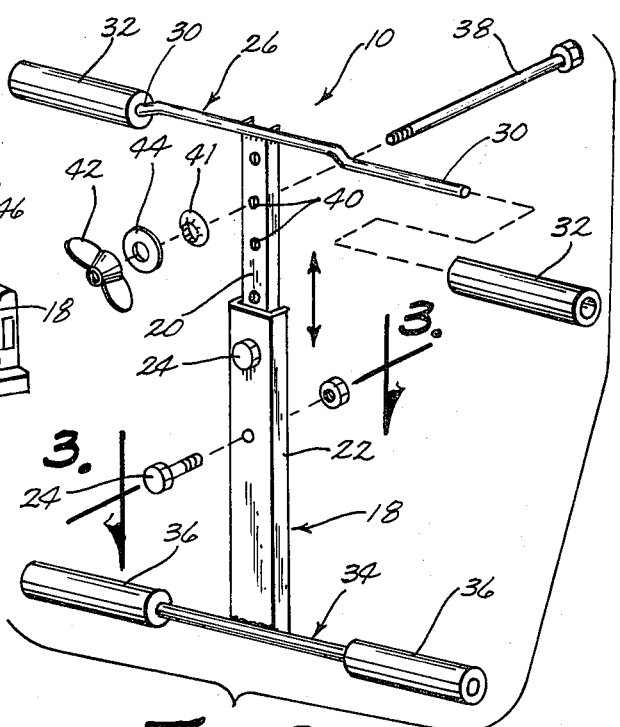
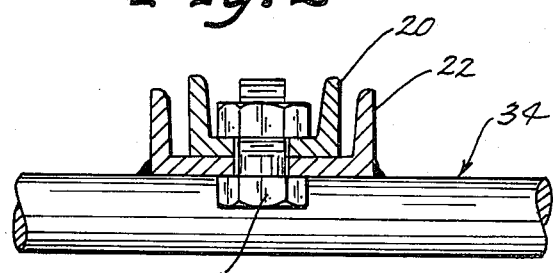
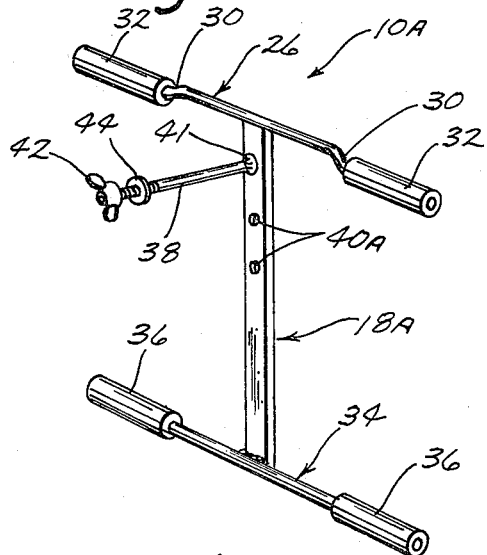
Fig. 1
Fig. 2
Fig. 3
Fig. 4
Fig. 5

VEHICLE SPARE TIRE CARRIER

BACKGROUND OF THE INVENTION

A mounting bracket for spare tires for pickup trucks is needed which is easily installed and removed when not being used and which may be installed in any desired location along the sidewalls of the box. The tire should be allowed to stand up and rest on the floor and be held tightly against the box sidewall and/or overhanging ledge. The tire bracket of this invention is designed to fill these needs.

SUMMARY OF THE INVENTION

Most pickup truck boxes include box sidewalls which have inwardly extending horizontal ledges which further include downwardly extending vertical flanges. A space is thus provided between the flange and the wall which is suitably adapted to receive the head of a vertically disposed spare tire bracket positioned in parallel relationship to the sidewall with its foot closely adjacent to the sidewall and engaging the floor. The bracket includes a vertically disposed frame member which may be telescopic and adjustable for a desired length to extend between the floor and the channel formed under the ledge between the flange and the box sidewall. A bolt extends through the frame member and is releasably connected to the wheel of the spare tire and when tightened down clamps the tire firmly against the flange on the ledge with the tire engaging the floor of the box and thus held firmly in place for transport.

The head of the bracket includes an elongated rod having oppositely disposed free ends on which cushion sleeve elements are telescopically mounted to cushion the engagement of the head with the ledge channel. Similar cushion and sleeve elements are mounted on an elongated rod forming the foot to cushion the engagement of the foot with the floor.

BRIEF DESCRIPTION OF THE DRAWINGS

FIG. 1 is a perspective view of a pickup truck utilizing the tire bracket of this invention.

FIG. 2 is an exploded perspective view of the tire bracket.

FIG. 3 is a cross-sectional view taken along line 3—3 in FIG. 2.

FIG. 4 is a cross-sectional view taken along line 4—4 in FIG. 1.

FIG. 5 is a perspective view of an alternate embodiment wherein the frame member is one piece.

DETAILED DESCRIPTION OF THE INVENTION

The vehicle spare tire carrier of this invention is referred to generally in FIGS. 1 and 2 by the reference numeral 10 and is shown in FIG. 1 mounted against the sidewall 12 of the box 14 of a pickup truck 16.

The carrier 10 includes a vertical frame 18 comprising telescoping channels 20 and 22 interconnected by bolts 24 and being adjustable to any desired length. The channel 20 carries at its upper end a head member 26 comprising an elongated transversally extending rod having end portions 30 slightly horizontally offset and displaced out of the plane of the frame member 18. Sleeve cushion elements 32 are provided on the end portions 30.

The lower channel 22 includes a foot member 34 formed from a rod which also has sleeve cushion elements 36 on the end portions.

A wheel mounting bolt 38 may be selectively positioned in one of several holes 40 in the upper channel 20 and relatively permanently held in place by a fastener lock washer 41. A wing nut 42 and washer 44 complete the bolt assembly.

The carrier 10 when installed is seen in FIG. 4 wherein the box wall 12 is seen to have an upper ledge 46 with a downwardly extending flange 48 providing a downwardly facing channel 50. The box wall 12 includes an inner wall 52 which cooperates with the flange 48 and ledge 46 to form the channel 50. The frame 18 is extended to its maximum length so that the head 26 and the foot 34 are positioned against the ledge 46 and the floor 54. The spare tire 56 is placed against the outside face of the downward extending flange 48 and rests on the floor 54 with the bolt 38 extending through the wheel's bolt hole 60. Tightening of the wing nut 42 draws the wheel tightly against the flange 48 of the ledge 46 and holds the tire securely to the box wall 12. The floor 54 is corrugated and includes low and high portions 62 and 64 respectively interconnected by shoulders 66 against which the foot 34 is positioned. This contributes to stabilizing the tire 56 as secured to the carrier 10.

An alternate embodiment is illustrated in FIG. 5 and differs only in that the vertical frame member 18A is one piece. The dimensions for a carrier 10 for certain trucks will be the same and thus adjustability is not needed. The carrier 18 FIG. 2 would fit a variety of different trucks having different box dimensions.

Thus it is seen that a simple, inexpensive spare tire carrier has been provided which can be mounted along either sidewall 12 of a pickup box, front or rear and the carrier may be easily removed when not in use if desired. The tire 56 is out of the way to maximize the space in the pickup box for transport purposes. In FIG. 1 the spare tire 56 is shown mounted at the front of the box on the wall 12 and a second carrier 10 is provided at the rear of the box on the same wall for a further tire if desired. It is to be further appreciated that the cushion elements 32 on the head member 26 and the cushion elements 36 on the foot member 34 provide for solid foot cushion contact between the carrier and the pickup box and eliminate vibration and rattling.

What is claimed is:

1. In combination with a vehicle having a box including a floor, an adjacent sidewall and a ledge extending horizontally inwardly from said sidewall and spaced over said floor and including a downwardly extending flange inwardly spaced from said sidewall, said floor including an outwardly facing shoulder in adjacent spaced relation from said sidewall and a generally horizontal portion between said shoulder and sidewall, a tire carrier comprising, a vertically disposed frame member including a pair of telescopically extendable channel portions and means for selectively locking said portions together at a desired length to provide said frame member with rigidity, an elongated head means on the upper end of said frame member including forwardly and rearwardly extending horizontally disposed head elements positioned between said downwardly extending flange and said sidewall to distribute the pressure on said flange over an area thereof, said head elements having opposite ends laterally offset, towards said flange, from a central portion of the elongated head means and sleeve means extending over said ends to provide cushioned engagement between said flange and said head ends, an elongated foot means on the lower end of said vertically disposed frame member including forwardly and rearwardly extending horizontally disposed foot elements with cushion sleeve means extending over said foot elements, said sleeve means engaging said horizontal portion of the floor and the outwardly facing shoulder thereof to distribute the pressure on said floor over an area and to increase the friction between said foot elements and said floor, said head elements and foot elements thereby cooperating to give the carrier stability against both rotational and inward displacement, and bolt means connected to said frame member medially thereof and extending laterally inwardly into engagement with the wheel of a tire with said tire engaging at its lower end said floor and its outer side engaging the inner side of said flange whereby said flange is clamped between said tire and said head means.

2. The structure of claim 1 wherein said frame member is one piece and rigid.

3. The structure of claim 1 wherein said bolt means is disposed in the upper half of said frame member adjacent said ledge.

4. A tire carrier for a vehicle having a box including a floor and an adjacent sidewall, and a ledge extending horizontally inwardly from said sidewall and spaced over said floor and including a downwardly extending flange inwardly spaced from said sidewall, said floor including an outwardly facing shoulder in adjacent spaced relation from said sidewall and a generally horizontal portion between said shoulder and sidewall, said tire carrier comprising:

a vertically disposed frame member, an elongated head means on the upper end of said frame member including forwardly and rearwardly extending horizontally disposed head elements, an elongated foot means on the lower end of said frame member including forwardly and rearwardly extending horizontally disposed foot elements, means for adjusting the length of said vertically disposed frame member to a dimension such that when said head elements are positioned between the downwardly extending flange and sidewall of a vehicle box, the foot elements engage the horizontal portion of the floor between said outwardly facing shoulder and sidewall whereby said head elements, said head elements having opposite ends laterally offset, towards said flange, from a central portion of the elongated head means and foot elements are operative to give the installed carrier stability against both retational and enward displacement, bolt means connected to said frame member medially thereof and extending laterally inwardly therefrom for engagement with the wheel of a tire supported on the floor of a vehicle box with its outer side engaging the inner side of the glange, thereby to clamp the flange between the tire and head elements, and cushion means on at least the top and inner surfaces of said head ends to provide cushioned engagement between said head ends and the ledge and flange of a vehicle box, and cushion means on at least the bottom and inner surfaces of said foot elements to provide cushioned engagement between said foot elements and the horizontal portion and outwardly facing shoulder of the floor of a vehicle box and to increase the friction between said foot elements and said floor.

* * * * *